United States Patent
Landais et al.

(10) Patent No.: US 9,801,156 B2
(45) Date of Patent: Oct. 24, 2017

(54) PAGING MESSAGE COORDINATION IN A MOBILE RADIO SYSTEM

(75) Inventors: Bruno Landais, Pleumeur-Bodou (FR); Vincent Muniere, Chaville (FR)

(73) Assignee: Alcatel-Lucent, Boulogne-Billancourt (FR)

( * ) Notice: Subject to any disclaimer, the term of this patent is extended or adjusted under 35 U.S.C. 154(b) by 1930 days.

(21) Appl. No.: 10/103,102

(22) Filed: Mar. 22, 2002

(65) Prior Publication Data

US 2002/0137532 A1 Sep. 26, 2002

(30) Foreign Application Priority Data

Mar. 23, 2001 (FR) ..................................... 01 03982

(51) Int. Cl.
*H04W 48/18* (2009.01)
*H04W 68/02* (2009.01)
*H04W 68/12* (2009.01)
*H04W 88/06* (2009.01)

(52) U.S. Cl.
CPC ............ *H04W 68/02* (2013.01); *H04W 48/18* (2013.01); *H04W 68/12* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 5,745,695 A * | 4/1998 | Gilchrist et al. | 709/227 |
| 6,438,375 B1 * | 8/2002 | Muller | 455/435.3 |
| 6,463,054 B1 * | 10/2002 | Mazur et al. | 370/352 |
| 6,560,239 B1 * | 5/2003 | Frid et al. | 370/426 |
| 2002/0122401 A1 * | 9/2002 | Xiang et al. | 370/338 |
| 2002/0160775 A1 * | 10/2002 | Pecen et al. | 455/434 |
| 2004/0120302 A1 * | 6/2004 | Sebire et al. | 370/347 |

FOREIGN PATENT DOCUMENTS

WO    WO 01/10080 A2    2/2001

* cited by examiner

*Primary Examiner* — Raj Jain
(74) *Attorney, Agent, or Firm* — Chiesa Shahinian & Giantomasi, PC

(57) ABSTRACT

The invention provides mobile radio system access network equipment including means for coordinating resources for circuit-switched mode services and packet-switched mode services, which resource coordination means are limited to means for coordinating sending circuit-switched mode service paging messages to a mobile station in packet-switched mode.

21 Claims, 2 Drawing Sheets

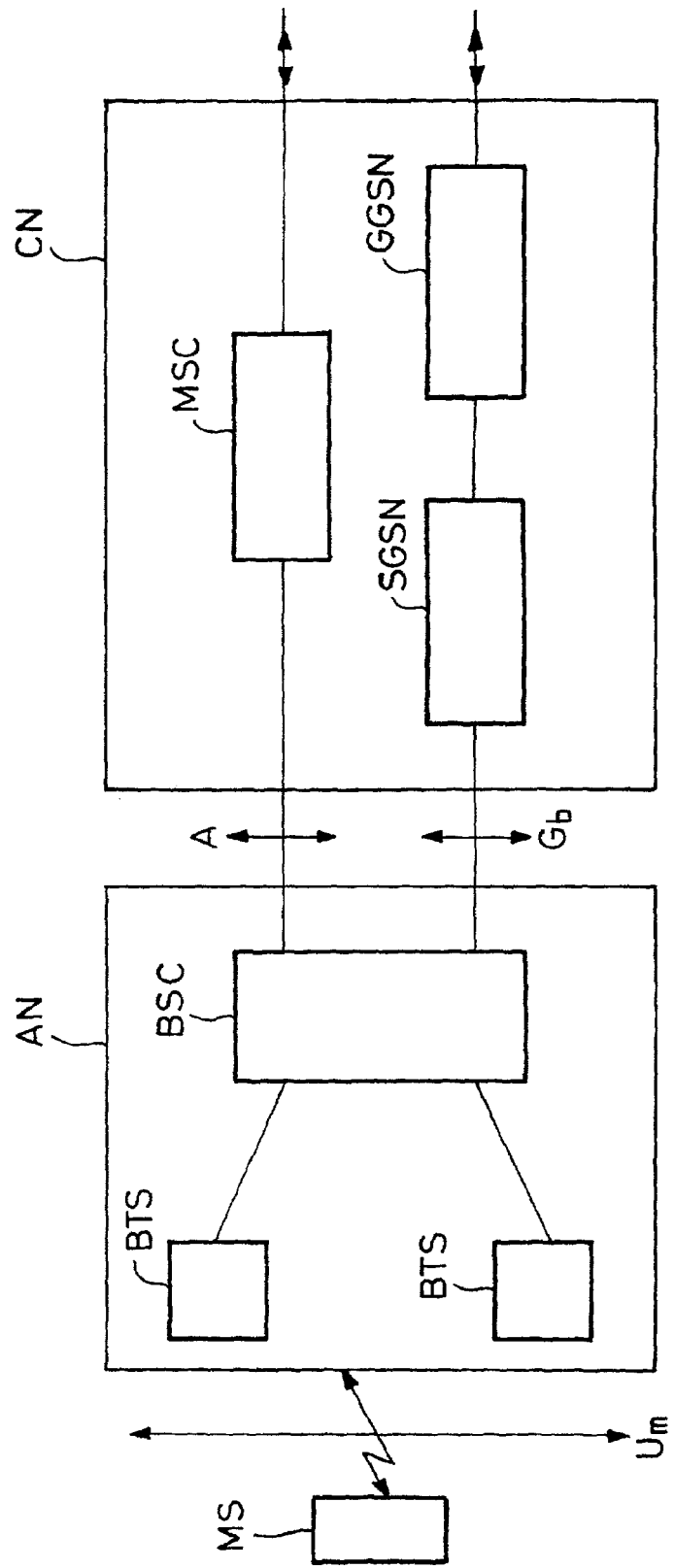

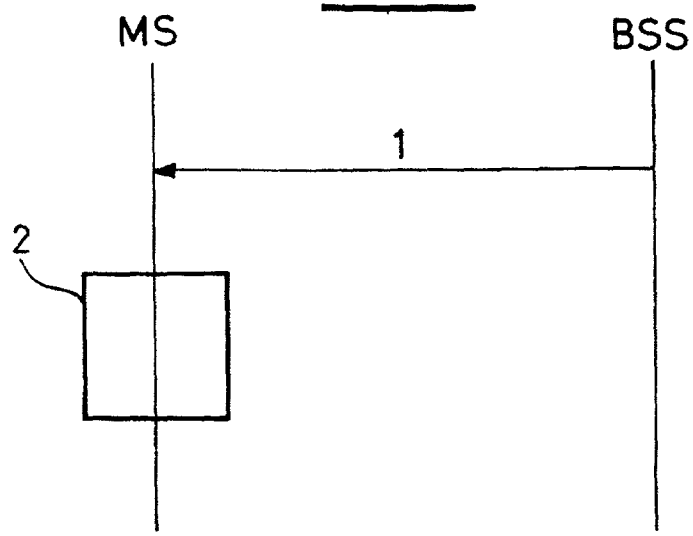
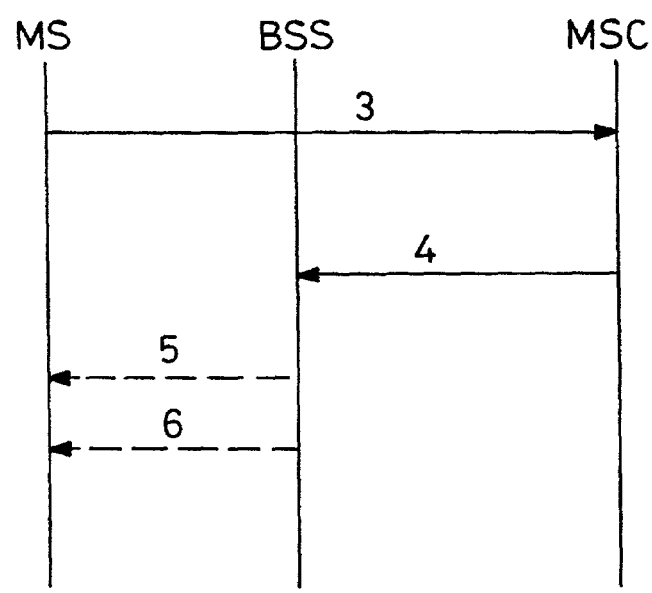

PAGING MESSAGE COORDINATION IN A MOBILE RADIO SYSTEM

BACKGROUND OF THE INVENTION

The present invention relates generally to mobile radio systems.

Generally speaking, in mobile radio systems, a distinction can be drawn between two types of services, namely circuit-switched mode services and packet-switched mode services. One example of packet-switched mode services is the General Packet Radio Service (GPRS) for Global System for Mobile communications (GSM) mobile radio systems.

The architecture of packet-switched mode systems, for example GSM/GPRS systems, is outlined in FIG. 1, and essentially comprises:

Base Transceiver Stations (BTS) communicating with Mobile Stations (MS) and Base Station Controllers (BSC), the combination of the BTS and the BSC being called the Base Station Subsystem (BSS), or more generally the Access Network (AN); and entities such as Serving GPRS Support Node (SGSN) entities, communicating on the one hand with the BSS and on the other hand with Gateway GPRS Support Node (GGSN) entities, which in turn communicate with external networks (not shown).

The interface between the MS and the BSS is called the Um interface and the interface between the BSC and the SGSN is called the Gb interface.

The BSS encompasses functions common to circuit-switched mode services and packet-switched mode services and functions specific to packet-switched mode services; the latter are supported by a particular entity of the BSS called the Packet Control Unit (PCU), not shown specifically in FIG. 1.

For circuit-switched mode services, and as also shown in FIG. 1, the BSS is connected to external networks via an entity called the Mobile-services Switching Center (MSC). The interface between the BSC and the MSC is called the A interface. The combination of the MSC (for circuit-switched mode services) and the SGSN and the GGSN (for packet-switched mode services) is called the Core Network (CN).

In the layered architecture used to describe the above systems, at the Um interface between the MS and the BBS, a distinction is drawn between:

a first layer, called the physical layer, and a second layer, called the link layer, which is further divided into a plurality of layers, which are, in increasing level order, a Medium Access Control (MAC) layer, a Radio Link Control (RLC) layer, and a Logical Link Control (LLC) layer.

Similarly, at the interface Gb between the BSS and the SGSN, a distinction is drawn between:

a first layer, called the physical layer, and a second layer, called the link layer, which is further divided into a plurality of layers, which are, in increasing level order, a Frame Relay layer, a BSS GPRS Protocol (BSSGP) layer, and a Logical Link Control (LLC) layer.

LLC frames are formed in the LLC layer from higher level data units. In LLC frames these data units are called LLC-protocol data units (LLC-PDU).

The LLC-PDU are then segmented in the MAC/RLC layer to form RLC data blocks. The RLC data blocks are then converted in the physical layer to the format required for transmission at the Um interface.

Signaling protocols are also provided, in particular for Radio Resource (RR) management, Mobility Management (MM), Session Management (SM), Logical Link (LL) control, etc.

For a detailed description of the above systems, see the corresponding standards, published by the corresponding standards organizations.

In accordance with the radio resource management protocol, a packet-switched mode mobile station can operate in either:

a packet transfer mode, in which resources are allocated temporarily, when there is actually data to be sent during a call, the resources for a given transmission direction forming a Temporary Block Flow (TBF) for transferring data between the mobile station and the network, or a packet idle mode, in which no TBF is set up.

In contrast, the mode in which resources are allocated to a mobile station in circuit-switched mode is called the dedicated mode, and the resources are dedicated resources in the sense that they are allocated to the mobile station for the duration of the call.

When it is switched on, a mobile station is in an idle mode.

Furthermore, the mobility management protocol defines a GPRS Attach procedure which changes a mobile station from the idle mode to a GPRS attached mode, in which it can access GPRS services. The converse GPRS Detach procedure is also defined. A mobile station is in packet-switched mode between the time at which it starts to access GPRS services (by means of the GPRS Attach procedure) and the time at which it ceases to access them (by means of the GPRS Detach procedure).

A mobile station in idle mode that is not GPRS attached communicates with the network by exchanging signaling on Common Control CHannels (CCCH). A mobile station in packet idle mode that is GPRS attached communicates with the network by exchanging signaling on Packet Common Control CHannels (PCCCH), if such channels are provided in the cell concerned, or via the CCCH. A mobile station in the packet transfer mode that is GPRS attached communicates with the network by exchanging signaling over Packet Data CHannels (PDCH).

The PDCH includes a Packet Data Traffic CHannel (PDTCH) and a Packet Associated Control CHannel (PACCH).

The CCCH includes a number of channels, in particular a Paging CHannel (PCH), also referred to herein as a common paging channel. Similarly, the PCCCH includes a number of channels, in particular a Packet Paging CHannel (PPCH). As the present invention is more particularly concerned with paging, the term "common paging channel" is used interchangeably hereinafter for the PCH itself and for the CCCH, and likewise the term "packet paging channel" is used interchangeably for the PPCH itself and for the PCCCH.

For a mobile station supporting both types of service (circuit-switched mode services and packet-switched mode services), either simultaneously or alternately, depending on its capacities, a Circuit Services paging message (CS paging message) is sent to a mobile station in packet idle mode or in packet transfer mode if a circuit-switched mode connection must be set up to the mobile station concerned.

Paging coordination is then advantageously employed, meaning that the network sends circuit-switched mode service paging messages on the same channel as that which is used to send packet-switched mode service paging messages, which is either a GPRS paging channel (i.e. the PCCCH, if present, or the CCCH otherwise) or a GPRS data channel (PDCH), if this kind of channel has been allocated to the mobile station.

The 3G TS 23.060 standard then makes a distinction between the network operating modes summarized below:

Network Operation Mode I (NMO I): the network sends a Circuit-Switched mode service paging message (CS paging message) to a GPRS attached mobile station, either on a GPRS paging channel (i.e. on the PCCCH, if present, or on the CCCH otherwise) or on a GPRS data channel (PDCH), if this kind of channel has been allocated to the mobile station. This means that the mobile station needs to listen to only one of the two paging channels (PCCCH or CCCH) if no other data channel has been allocated to it; if a GPRS data channel has been allocated to it, it receives the paging message on that channel. Thus in this mode coordination is effected by the core network.

Network Operation Mode II (NMO II): the network sends a Circuit-Switched mode service paging message (CS paging message) to a GPRS attached mobile station on the common paging channel (CCCH), which is also the GPRS paging channel (the packet paging channel is not provided in the cell concerned). This means that the mobile station need only listen to the common paging channel (CCCH), but it can listen to this channel even if it has been allocated a GPRS data channel. It is therefore considered that there is no coordination in this operation mode.

Network Operation Mode III (NMO III): the network sends a Circuit-Switched mode service paging message (CS paging message) to a GPRS attached mobile station on the common paging channel (CCCH) and sends a Packet-Switched mode service paging message (PS paging message) on the GPRS paging channel, i.e. either on the packet paging channel (PCCCH), if provided in the cell concerned, or on the common paging channel (CCCH) otherwise. This means that a mobile station in packet idle mode wishing to receive circuit-switched mode service paging messages as well as packet-switched mode service paging messages must listen to both paging channels (the common paging channel and the packet paging channel) if a packet paging channel is provided in the cell concerned. Furthermore, a mobile station in packet transfer mode can also listen to the common paging channel in order not to miss circuit-switched mode service paging messages. Thus no coordination is effected by the network in this mode.

The network operation mode is NMO I if an interface called the Gs interface is provided between the MSC and SGSN entities. In this case circuit-switched mode service paging messages originating from the MSC and addressed to a GPRS attached mobile station take a path that passes through the SGSN. This is because, by virtue of the Gs interface, the MSC can tell if a mobile station is GPRS attached. If it is not GPRS attached, the circuit-switched mode service paging message is sent to the BSS via the A interface. If it is GPRS attached, the circuit-switched mode service paging message is sent to the SGSN via the Gs interface and is then forwarded from the SGSN to the PCU entity of the BSS via the Gb interface. The PCU can then send this message on the appropriate channel, that is to say:

the PACCH if the mobile station is in the packet transfer mode, or the PCCCH if the mobile station is in the packet idle mode and this kind of channel is provided in the cell concerned, or the CCCH if the mobile station is in the packet idle mode and no PCCCH is provided in the cell concerned.

However, the presence of the Gs interface imposes a number of constraints. In particular, this involves using new Mobility Management (MM) procedures for packet-switched mode services. This is because, as specified in the 3G TS 23.060 standard, combined circuit/packet MM procedures must then be supported, which could call into question the quality of service for circuit-switched mode services. Moreover, as no system including a Gs interface is yet commercially available, implementation faults cannot be ruled out initially. For these reasons, some operators have stated that they do not intend to deploy any such interface.

A need therefore exists for paging coordination without using this kind of interface, i.e. for paging coordination by the BSS.

The current version of the 3G TS 04.60 standard specifies that paging using the PACCH is applied when a paging message is sent to a mobile station in packet transfer mode that is GPRS attached and if the network is capable of coordinating the paging request with the radio resources allocated to the mobile station on the PDCH. It further specifies that this type of paging coordination must be provided in NMO I (cf. 3G TS 23.060), and that the mobile station must assume that this type of paging coordination is also provided in NMO II and NMO III if the network indicates that it supports the Dual Transfer Mode (DTM) function.

Briefly, the DTM function supports both types of service (circuit-switched mode services and packet-switched mode services) simultaneously, the BSS coordinating the resources necessary for each of these modes. For a detailed description of this function, see the corresponding standards.

Thus the current version of the 3G TS 04.60 standard specifies a particular type of paging coordination (using the PACCH) for NMO II and NMO III (i.e. for operating modes that do not necessitate the presence of the Gs interface), provided that the network supports the DTM function.

However, this kind of solution does not constitute a general solution to the problem of coordination of paging by the BSS.

In particular, this type of coordination is provided only if the DTM function is supported. This is not the case in all equipment.

Furthermore, the applicant has observed that this kind of solution also suffers from the following drawbacks and/or limitations:

In reality, it is not necessary for the DTM function to be supported for the BSS to support paging coordination.

If paging coordination is supported without the DTM function being supported, the mobile station cannot tell this at present, since in the present version of the standard the network merely indicates to the mobile station its operating mode and if the DTM function is supported. This being so, the mobile station could listen to a paging channel when it is in packet transfer mode (in which case a data channel has been allocated to it), with the potential consequence of a loss of MAC/RLC data blocks sent on the data channel and/or Circuit-Switched mode service messages (CS paging messages) that might be sent on the data channel.

If paging coordination is supported, and if the mobile station can tell that this is so, it is still the case that coordination is at present not possible in the case of a mobile station in packet idle mode and a cell in which both types of paging channel (packet paging channel (PCCCH) and common paging channel (CCCH)) are provided. This is because, in this case, the mobile station would have to listen to the PCCCH to receive packet-switched mode service paging messages and to the CCCH to receive circuit-switched mode service paging messages. One solution would be not to provide PCCCH (in addition to CCCH), but this kind of solution is not satisfactory, in particular because it cannot support an increase in packet-switched mode traffic, and because it does not provide the benefit of additional functions available only if PCCCH are provided.

A need therefore exists to eliminate some or all of the drawbacks previously cited in order to provide an effective solution to the problem of coordination of paging by the BSS (or the access network).

SUMMARY OF THE INVENTION

An object of the present invention is to satisfy this requirement.

The invention therefore provides mobile radio system access network equipment including means for coordinating resources for circuit-switched mode services and packet-switched mode services, which equipment is essentially characterized in that said resource coordination means are limited to means for coordinating sending circuit-switched mode service paging messages to a mobile station in packet-switched mode.

According to another feature of the invention, said paging message coordination means send circuit-switched mode service paging messages on a data channel in the case of mobile stations in the packet transfer mode.

According to another feature of the invention, said paging message coordination means send circuit-switched mode service paging messages on a common paging channel in the case of mobile stations in the packet idle mode when only one type of paging channel is provided, namely a common paging channel.

According to another feature of the invention, said paging message coordination means send circuit-switched mode service paging messages on a packet paging channel in the case of mobile stations in the packet idle mode when two types of paging channel are provided, namely a common paging channel and a packet paging channel.

According to another feature of the invention, said system is a GSM/GPRS system and said access network is a Base Station Subsystem (BSS).

The invention also provides a method of coordinating sending circuit-switched mode service paging messages to a mobile station in packet-switched mode in a mobile radio system, which method is characterized in that it comprises the following steps:
 the access network informs the mobile stations that it supports such coordination, and
 if the access network supports such coordination, the mobile stations do not listen to the paging channels when they are in the packet transfer mode.

According to another feature of the invention, the mobile stations receive said circuit-switched mode service paging messages on a data channel when they are in the packet transfer mode.

According to another feature of the invention, the mobile stations receive said circuit-switched mode service paging messages on the common paging channel when the mobile stations are in the packet idle mode and only one type of paging channel is provided, namely a common paging channel.

According to another feature of the invention, the mobile stations receive circuit-switched mode service paging messages on a packet paging channel in the case of mobile stations in the packet idle mode when two types of paging channel are provided, namely a common paging channel and a packet paging channel.

According to another feature of the invention, said system is a GSM/GPRS system and said data channel is a Packet Data CHannel (PDCH).

According to another feature of the invention, said system is a GSM/GPRS system, said common paging channel is a Common Control Channel (CCCH) and said packet paging channel is a Packet Common Control Channel (PCCCH).

The invention further provides a mobile radio system including means for implementing the above method.

The invention further provides mobile radio system network equipment including means for implementing the above method.

The invention further provides a mobile radio system mobile station including means for implementing the above method.

The invention further provides a method of coordinating sending circuit-switched mode service paging messages to a mobile station in packet-switched mode in a mobile radio system, which method is essentially characterized in that it comprises the following steps:
 a mobile station which is attached in packet-switched mode informs a network entity in charge of circuit-switched mode service call management of this fact,
 said information is added to a circuit-switched mode service paging message received by the access network, and
 two types of paging channel being provided for sending paging messages, namely common paging channels and packet paging channels, if said information indicates that the mobile station is attached in packet-switched mode, the access network sends said circuit-switched mode service paging message to the mobile station on a packet paging channel.

According to another feature of the invention, the mobile stations receive said circuit-switched mode service paging messages on a data channel when they are in the packet transfer mode.

According to another feature of the invention, the mobile stations receive said circuit-switched mode service paging messages on the common paging channel when the mobile stations are in the packet idle mode and a single type of paging channel is provided, namely a common paging channel.

According to another feature of the invention, said system is a GSM/GPRS system and said entity in charge of circuit-switched mode service call management is a Mobile-services Switching Center (MSC).

According to another feature of the invention, said system is a GSM/GPRS system and said access network is a Base Station Subsystem (BSS).

According to another feature of the invention, said system is a GSM/GPRS system, said common paging channel is a Common Control CHannel (CCCH), and said packet paging channel is a Packet Common Control CHannel (PCCCH).

The invention further provides a mobile radio system including means for implementing the above method.

The invention further provides mobile radio system network equipment including means for implementing the above method.

The invention further provides a mobile radio communication system mobile station including means for implementing the above method.

BRIEF DESCRIPTION OF THE DRAWINGS

Other objects and features of the present invention will become apparent on reading the following description of embodiments of the invention, which is given with reference to the accompanying drawings, in which:

FIG. 1 (described above) is a diagram showing the general architecture of a GSM/GPRS cellular mobile radio system, FIG. 2 is a diagram showing one embodiment of a method according to the invention, and FIG. 3 is a diagram showing another embodiment of a method according to the invention.

DETAILED DESCRIPTION OF THE INVENTION

The invention therefore relates to the coordination of paging by the BSS (or the access network) in a mobile radio system.

In accordance with a first aspect, and in particular in a GSM/GPRS system, the invention proposes that it is not necessary for the DTM function to be supported for the BSS to support paging coordination.

Accordingly, the invention firstly provides mobile radio system access network equipment essentially including means for coordinating resources for circuit-switched mode services and packet-switched mode services, which resource coordination means are limited to means for coordinating sending circuit-switched mode service paging messages to a mobile station in packet-switched mode.

For example, said paging message coordination means send circuit-switched mode service paging messages on a data channel in the case of mobile stations in the packet transfer mode.

For example, said paging message coordination means send circuit-switched mode service paging messages on a common paging channel in the case of mobile stations in the packet idle mode when only one type of paging channel is provided, namely a common paging channel.

For example, said paging message coordination means send circuit-switched mode service paging messages on a packet paging channel in the case of mobile stations in the packet idle mode when two types of paging channel are provided, namely a common paging channel and a packet paging channel.

For example, said system is a GSM/GPRS system and said access network is a Base Station Subsystem (BSS).

In a second aspect, the invention proposes that, if paging coordination is supported independently of an awareness that the DTM function is supported, the network should inform the mobile stations of this fact. If not, the mobile stations could listen to the paging channels when they are in packet transfer mode (in which case they have been allocated a data channel), with the potential consequence of losing MAC/RLC data blocks sent on the data channel and/or any Circuit-Switched mode service paging messages (CS paging messages) sent on the data channel.

Accordingly, the invention secondly provides a method of coordinating sending circuit-switched mode service paging messages to a mobile station in packet-switched mode in a mobile radio system, which method is essentially characterized in that it comprises the following steps:

the access network informs the mobile stations that it supports such coordination, and if the access network supports such coordination, the mobile stations do not listen to the paging channels when they are in the packet transfer mode.

Referring to FIG. 2, in step 1, the access network AN indicates to the mobile stations MS its capacity to support paging coordination. For example, a new flag is introduced into the system information broadcast by the access network on broadcast channels, such as, in GSM/GPRS systems in particular, the Broadcast Control CHannel (BCCH) or the Packet Broadcast Control CHannel (PBCCH). For example, in GSM/GPRS systems, this indicates the capacity of the BSS to support paging coordination if the network operating mode is NMO II or NMO III. Because they receive this information, the mobile stations MS in packet transfer mode do not listen to the paging channels (step 2). Accordingly, in the GSM/GPRS system, when paging coordination is supported, the mobile stations do not listen to the common Paging CHannel (PCH) or the Packet Paging CHannel (PPCH) when they are in the packet transfer mode.

For example, the mobile stations receive said circuit-switched mode service paging messages on a data channel when they are in the packet transfer mode.

For example, the mobile stations receive said circuit-switched mode service paging messages on the common paging channel when they are in the packet idle mode and only one type of paging channel is provided, namely a common paging channel.

For example, the mobile stations receive circuit-switched mode service paging messages on a packet paging channel when they are in the packet idle mode and two types of paging channel are provided, namely a common paging channel and a packet paging channel.

In the GSM/GPRS system in particular:
said data channel is a Packet Data CHannel (PDCH), and
said common paging channel is a Common Control CHannel (CCCH) and said packet paging channel is a Packet Common Control CHannel (PCCCH).

A third aspect of the invention proposes a solution to the problem of coordination of paging by the access network (BSS) in the case of a mobile station in packet idle mode when both types of paging channel (packet paging channel (PCCCH) and common paging channel (CCCH)) are provided.

Accordingly, the invention thirdly provides a method of coordinating sending circuit-switched mode service paging messages to a mobile station in packet-switched mode in a mobile radio system, which method essentially includes the following steps:

a mobile station which is attached in packet-switched mode informs a network entity in charge of circuit-switched mode service call management of this fact, said information is added to a circuit-switched mode service paging message received by the access network, and two types of paging channel being provided, namely common paging channels and packet paging channels, if said information indicates that the mobile station is attached in packet-switched mode, the access network sends said circuit-switched mode service paging message to the mobile station on a packet paging channel.

For example, the mobile stations receive said circuit-switched mode service paging messages on a data channel when they are in the packet transfer mode.

For example, the mobile stations receive said circuit-switched mode service paging messages on the common paging channel when they are in the packet idle mode and a single type of paging channel is provided, namely a common paging channel.

In particular, in the GSM/GPRS system:

said entity in charge of call management for circuit-switched mode services is a Mobile-Services Switching Center (MSC), said access network is a Base Station Subsystem (BSS), and said common paging channel is a Common Control CHannel (CCCH) and said packet paging channel is a Packet Common Control CHannel (PCCCH).

For example, referring to FIG. 3, a mobile station MS which is GPRS attached informs the MSC of this (step 3), for example by means of a Location Area Update procedure or an IMSI Attach procedure (see the corresponding standards for more details on these procedures). The mobile station can also inform the MSC of its DRX parameters, which are necessary to determine the occurrences of paging of the mobile station on the Packet Paging CHannel (PPCH) (these parameters are also defined in the corresponding standards). Conversely, the mobile station also informs the MSC that it is GPRS detached when it has effected the converse GPRS Detach procedure.

The MSC can then send a Circuit-Switched mode service paging message (CS paging message) to the BSS via the A interface (step 4), with information indicating whether the mobile station is GPRS attached or not. The DRX parameters can be added to this information. Given this information, the BSS is able to determine if a paging message for a mobile station that is not in the packet transfer mode must be sent on the common Paging CHannel (PCH) (step 5) or on the Packet Paging CHannel (PPCH) (step 6), depending on whether the mobile station is GPRS attached or not, steps 5 and 6 being shown in dashed outline to indicate this choice.

Note that the figures described represent embodiments of methods in accordance with the invention in only a high schematic manner, only to the extent needed to understand the invention, and without going into the details of the signaling protocols or procedures, which can be based on principles well known in such systems.

The present invention also provides, over and above such methods, a mobile radio system, a mobile radio network or a mobile radio network equipment unit or entity, and a mobile station, all including means for implementing such methods.

The particular implementation of such means representing no particular difficulty for the person skilled in the art, such means do not need to be described here in any more detail than by stating their function, as above.

Finally, note that the various aspects of the invention can be used separately or in conjunction.

The features of the various methods, systems, networks or network equipment units, and mobile stations can also be used separately or in conjunction.

The invention claimed is:

1. A method of paging coordination, said method comprising the steps of:

indicating, by a radio access network equipment to mobile stations, that the radio access network equipment supports paging coordination for sending circuit-switched mode service paging messages to the mobile stations, independently of whether dual transfer mode (DTM) functionality is supported by said radio access network equipment, in a network mode of operation where paging coordination cannot be performed by a core network, and upon receipt of said indication from the radio access network equipment, the mobile stations in packet transfer mode receive said circuit-switched mode service paging messages on a Packet Associated Control Channel.

2. The method according to claim 1, wherein the mobile stations receive said circuit-switched mode service paging messages on a common paging channel when the mobile stations are in packet idle mode and only one type of paging channel is provided.

3. The method according to claim 1, wherein the mobile stations receive said circuit-switched mode service paging messages on a packet paging channel in case of mobile stations in packet idle mode when at least one of two types of paging channels are provided.

4. The method according to claim 3, wherein said common paging channel is a Common Control Channel (CCCH) and said packet paging channel is a Packet Common Control Channel (PCCCH).

5. The method according to claim 1, wherein said indication is broadcast by the radio access network equipment in a Broadcast Control Channel (BCCH) or a Packet Broadcast Control Channel (PBCCH).

6. The method according to claim 1, wherein said network mode of operation corresponds to Network Mode of Operation II or III of a General Packet Radio Service (GPRS) network.

7. Radio access network equipment, configured to:

support paging coordination for sending circuit-switched mode service paging messages to mobile stations, independently of whether dual transfer mode functionality is supported by said radio access network equipment, in a network mode of operation where paging coordination cannot be performed by a core network, and indicate to the mobile stations that the radio access network equipment supports said paging coordination.

8. The radio access network equipment according to claim 7, wherein said indication is broadcast by the radio access network equipment in a Broadcast Control Channel (BCCH) or a Packet Broadcast Control Channel (PBCCH).

9. The radio access network equipment according to claim 7, wherein said network mode of operation corresponds to Network Mode of Operation II or III of a General Packet Radio Service (GPRS) network.

10. A mobile station configured to:

receive from a radio access network equipment an indication that said radio access network equipment supports paging coordination for sending of circuit-switched mode service paging messages to mobile stations, independently of whether dual transfer mode functionality is supported by said radio access network equipment, in a network mode of operation where paging coordination cannot be performed by a core network; and wherein, upon receiving indication from the radio access network equipment, the mobile station in packet transfer mode receives said circuit-switched mode service paging messages on a Packet Associated Control Channel.

11. The mobile station according to claim 10, wherein the mobile station receives said circuit-switched mode service paging messages on a common paging channel when the mobile station is in packet idle mode and only one type of paging channel is provided.

12. The mobile station according to claim 10, wherein the mobile station receives said circuit-switched mode service paging messages on a packet paging channel in case of mobile station in packet idle mode when at least one of two types of paging channels are provided.

13. The mobile station according to claim 12, wherein said common paging channel is a Common Control Channel (CCCH) and said packet paging channel is a Packet Common Control Channel (PCCCH).

14. The mobile station according to claim 10, wherein said indication is broadcast by the radio access network equipment in a Broadcast Control Channel (BCCH) or a Packet Broadcast Control Channel (PBCCH).

15. The mobile station according to claim 10, wherein said network mode of operation corresponds to Network Mode of Operation II or III of a General Packet Radio Service (GPRS) network.

16. A mobile radio system comprising:
   radio access network equipment configured to:
      indicate to mobile stations that the radio access network equipment supports paging coordination for sending circuit-switched mode service paging messages to the mobile stations, independently of whether dual transfer mode functionality is supported by said radio access network equipment, in a network mode of operation where paging coordination cannot be performed by a core network, and when the radio access network equipment indicates said support to the mobile stations, send said circuit-switched mode service paging messages to said mobile stations on a Packet Associated Control Channel, and
   a mobile station configured to:
      receive from the radio access network equipment an indication that said radio access network equipment supports paging coordination for sending of circuit-switched mode service paging messages to the mobile station, independently of whether dual transfer mode functionality is supported by said radio access network equipment, in a network mode of operation where paging coordination cannot be performed by a core network, and
      wherein, upon receiving the indication from the radio access network equipment, the mobile station in packet transfer mode receives said circuit-switched mode service paging messages on a Packet Associated Control Channel.

17. The mobile radio system according to claim 16, wherein the mobile station receives said circuit-switched mode service paging messages on a common paging channel when the mobile station is in packet idle mode and only one type of paging channel is provided.

18. The mobile radio system according to claim 16, wherein the mobile station receives the circuit-switched mode service paging messages on a packet paging channel in case of mobile station in packet idle mode when at least one of two types of paging channels are provided.

19. The mobile radio system according to claim 18, wherein said common paging channel is a Common Control Channel (CCCH) and said packet paging channel is a Packet Common Control Channel (PCCCH).

20. The mobile radio system according to claim 16, wherein said indication is broadcast by the radio access network equipment in a Broadcast Control Channel (BCCH) or a Packet Broadcast Control Channel (PBCCH).

21. The mobile radio system according to claim 16, wherein said network mode of operation corresponds to Network Mode of Operation II or III of a General Packet Radio Service (GPRS) network.

* * * * *